United States Patent [19]
Bennett

[11] Patent Number: 5,658,039
[45] Date of Patent: Aug. 19, 1997

[54] WIND PROTECTION STRUCTURES FOR A CABRIOLET

[76] Inventor: Robin E. P. Bennett, Torwanger Str. 1, 81669 Munich, Germany

[21] Appl. No.: 520,401

[22] Filed: Aug. 29, 1995

[30]     Foreign Application Priority Data

Aug. 29, 1994 [DE] .Germany .................. 44 30 672.5

[51] Int. Cl.$^6$ ........................................ B60J 7/22
[52] U.S. Cl. ........................... 296/180.5; 296/85
[58] Field of Search ................ 296/85, 180.1, 296/180.5

[56]         References Cited

U.S. PATENT DOCUMENTS

| | | | |
|---|---|---|---|
| 998,320 | 7/1911 | Auster | 296/85 |
| 1,018,973 | 2/1912 | Hofbauer | 296/85 |
| 4,854,634 | 8/1989 | Shiraishi et al. | 296/108 |
| 5,253,916 | 10/1993 | Moore et al. | 296/180.5 |

FOREIGN PATENT DOCUMENTS

| | | |
|---|---|---|
| 0 394 675 B1 | 12/1991 | European Pat. Off. . |
| 0 398 027 B1 | 7/1992 | European Pat. Off. . |
| 0 316 749 B1 | 6/1993 | European Pat. Off. . |
| 26353 | 11/1923 | France ............... 296/85 |
| 4018862 | 1/1992 | Germany ........... 296/85 |
| 4239428 | 3/1994 | Germany ........... 296/85 |
| 43 11 240 C1 | 4/1994 | Germany . |
| 75608 | 1/1918 | Switzerland ....... 296/85 |
| 9003286 | 4/1990 | WIPO ............ 296/180.1 |

*Primary Examiner*—Dennis H. Pedder
*Attorney, Agent, or Firm*—Fenwick & West LLP

[57]         ABSTRACT

A wind protection structure for a cabriolet extends across the entire width of the vehicle behind a row of seats, and is capable of being put in a position in which it covers a rear section of the opening of the vehicle body in the rear seat area, like a roof, as well as a position directly rear of the front seats of a cabriolet.

10 Claims, 4 Drawing Sheets

WIND PROTECTION STRUCTURES FOR A CABRIOLET

BACKGROUND OF THE INVENTION

1. Field of the Invention

The invention refers to a wind protection for a cabriolet.

2. Description of Related Art

Above the passenger space of a cabriolet driving with open top, as is well known, air turbulences develop which are felt in the passenger space as an unpleasant draught. The passengers sitting in the front seats are here affected by a draught which acts on them mainly at the back. On the other hand, the passengers sitting on the rear seats are affected by a draught which acts on them from the top and also from the back. A wind protection such as this is disclosed in DBN 43 11 240 C1.

In order to reduce the draught, a wind protection structure is fitted behind a front seat row, such as has been disclosed for example in the EP 0 394 675 B1 or the EP 0 316 749 BT.

Such a wind protection is essentially composed of a frame, into which an elastic net has been fitted. The net is on the one hand in the position of retarding the air flow, but on the other it is also transparent. Such a net has been disclosed by the EP 0 398 027 B1. The wind protection is fitted transversely to the direction of driving, at head height, vertically, behind the front seats. The fixing of the wind protection is effected by means of clamps and/or straps, which may be connected to the vehicle body in the area of the back of the car (back seat area).

SUMMARY OF THE INVENTION

The invention has the task of creating a wind protection for a cabriolet, which will provide the passengers sitting in the rear seats as well as the passengers sitting in the front seats with an effective protection, with it being, in addition, simple to fix in place.

Wind protection for a cabriolet extends across the entire width of the vehicle behind a row of seats, and is capable of being put in a position in which it covers a rear section of the opening of the vehicle body in the rear seat area, like a roof.

By the fact that the wind protection can be put in a position where it rests with its lower edge on the upper edge of the back resets of the rear seats, and is arranged inclined forwards in the driving, direction, it forms a kind of roof above the rear seats. In this position, in particular children sitting on the rear seats are protected from unpleasant air turbulences. In addition to that, the wind protection fitted in this position also provides a sufficient amount of protection for the passengers sitting on the front seats.

By employing the hard top fixing devices which are generally present on a cabriolet body, or which can at least be subsequently fitted, it is possible in a simple manner to fix the wind protection securely without any additional fixtures having to be provided at any points on the vehicle body, the inner trim or the upholstery, or with these being subjected to any greater stress and thus being worn out prematurely.

It is particularly advantageous, in this that both for winter operation with hard top and also for summer operation with wind protection, only one fixture installation need be provided.

The invention is explained in greater detail with the aid of preferred examples of construction, taking reference to the drawings.

DESCRIPTION OF THE PREFERRED EMBODIMENTS

Figure 1:
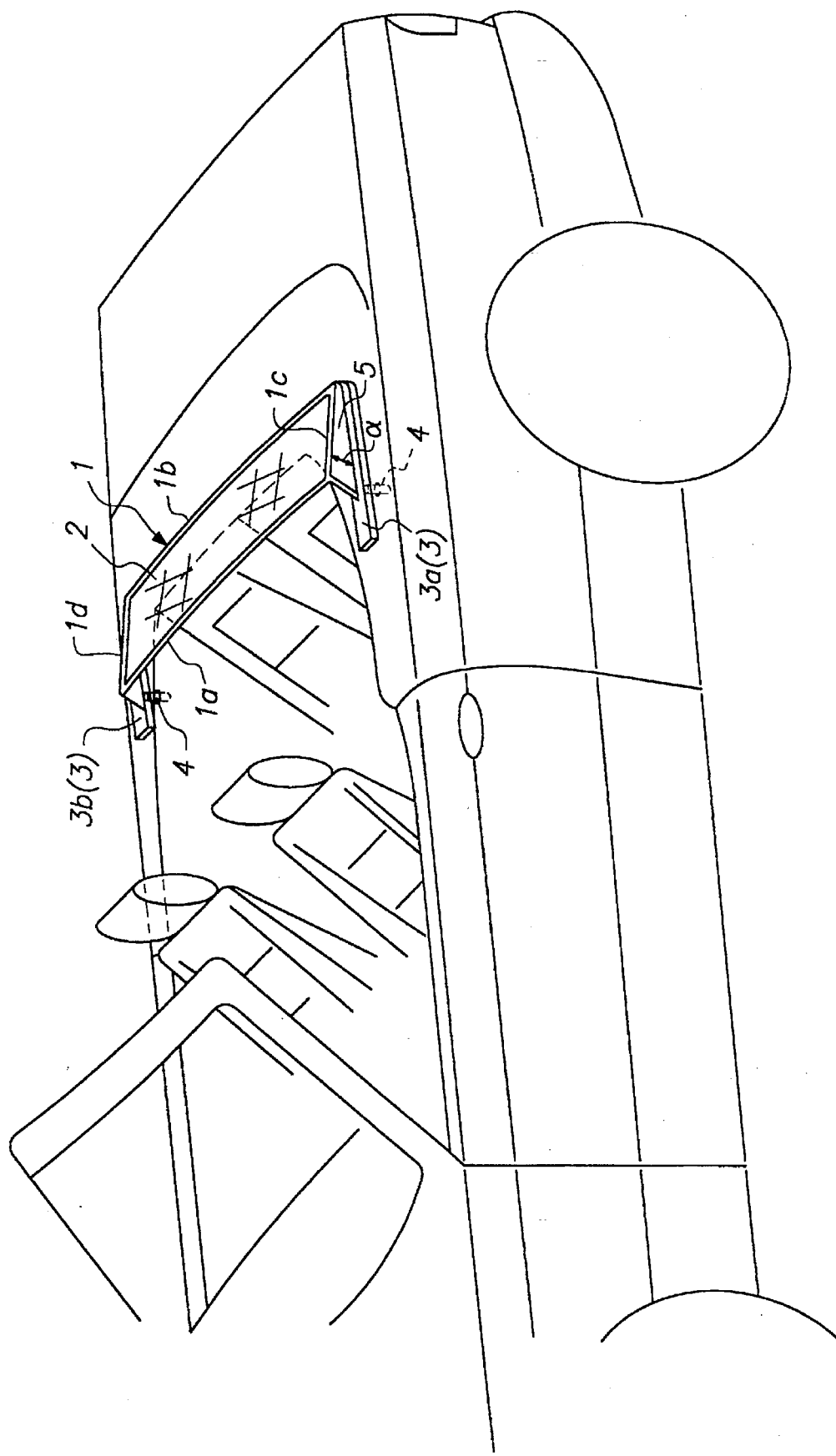
FIG. 1 shows an oblique view of a wind protection structure.
Figure 2:
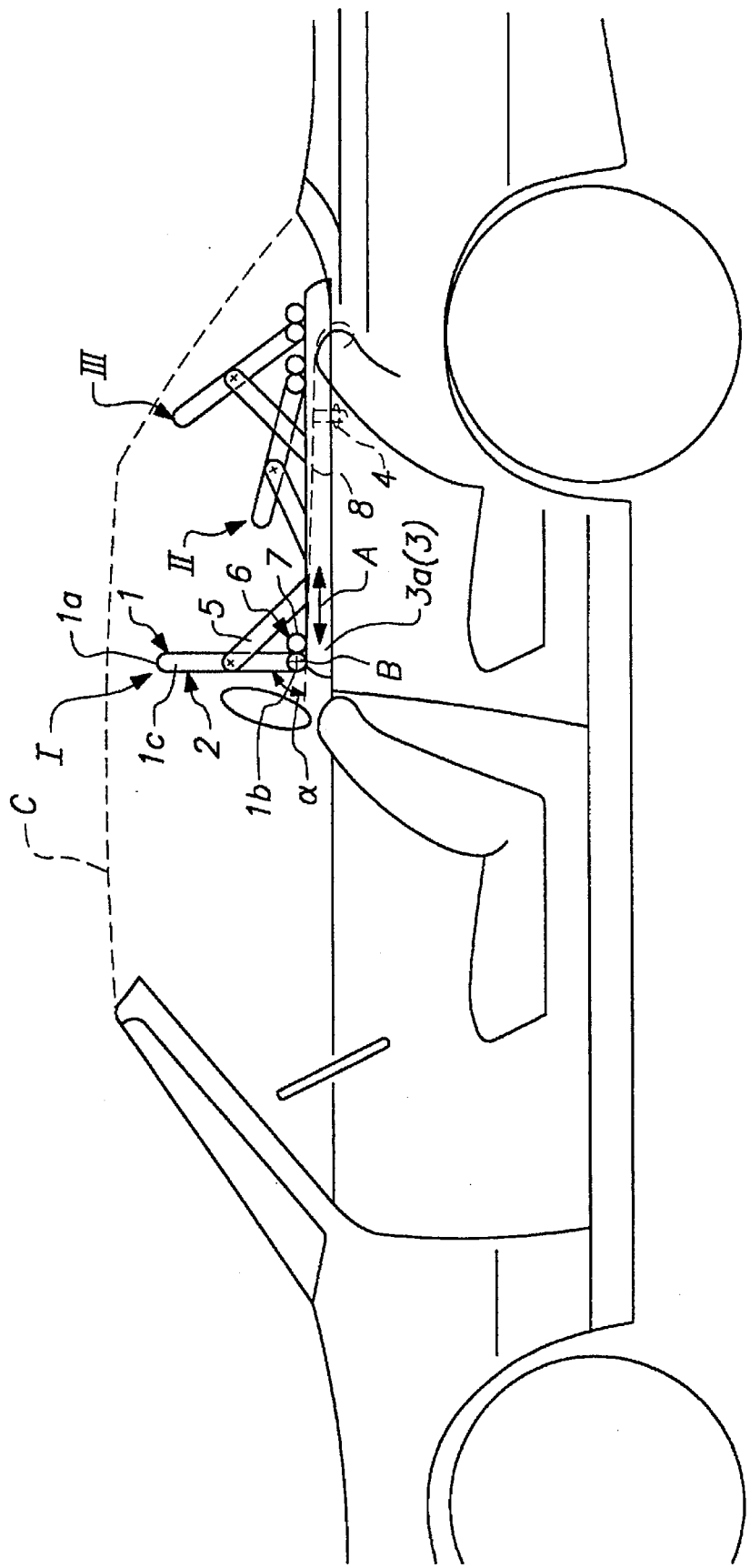
FIG. 2 shows a further wind protection structure in side view.
Figure 3:
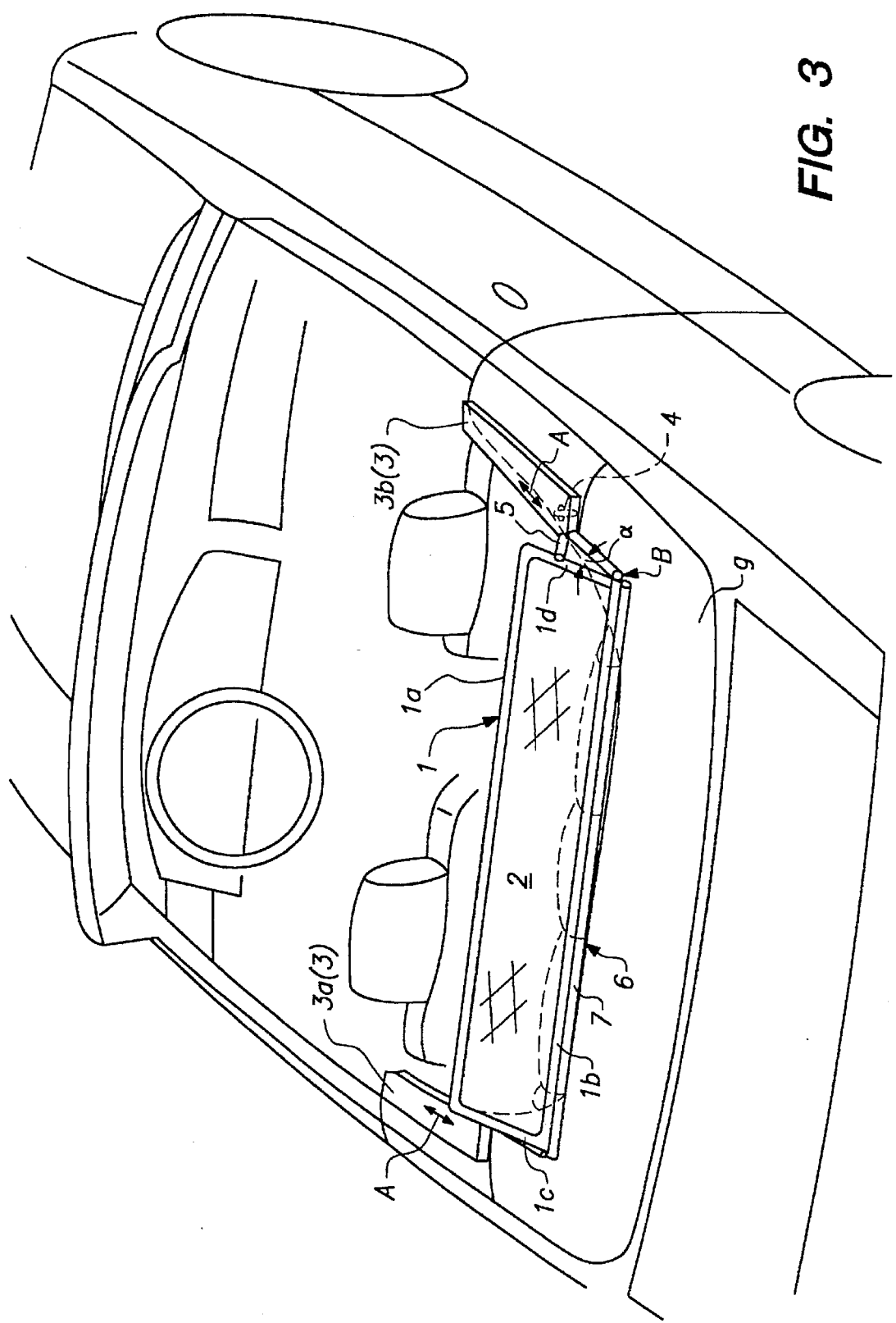
FIG. 3 shows an oblique view of the wind protection structure according to FIG. 2.

In FIGS. 1, 2 and 3 respective wind protection for a cabriolet are shown. The wind protection structure according to one embodiment of the present invention has a frame 1 made of tubing, which is essentially composed of an upper transverse strut 1a, a lower transverse strut 1b, and lateral struts 1c, 1d, joining the ends of the two transverse struts, so that the frame has essentially a rectangle form. A transparent net 2 retarding the air flow is fitted into frame 1. Instead of net 2, a flexible Plexiglas pane may also be fitted. The frame 1 has a width which essentially extends over the entire width of the passenger space of the cabriolet, and may, in particular behind a row of rear seats, be fitted in a position in which with its lower transverse edge or transverse strut respectively it is lined up in parallel to the upper edge of the back seat of the rear row of seats and adjacent to it. In this case, the wind protection is inclined against the driving direction, so that it covers the rear area of the passenger space aperture, and preferably about half the rear section of the passenger space aperture. By the forward inclination against the direction of travel, it forms a kind of protective roof above the heads of the passengers seated on the rear seat row.

Frame 1 is fixed by its two lower corner points to a console 3. The console is composed of two longitudinal parts 3a, 3b, which lie on the two side sections of the upper edge of the vehicle body in the area of the passenger space. On one side of each respective part console 3a, 3b, a fitting 4 is constructed which acts together with the hard top fixtures provided on the vehicle body at the side sections of the upper edge of the body, so as to join the wind protection arrangement securely to the vehicle body. The hard top fixture constructed on the vehicle body is here provided with a fixing element (not shown here) which can be brought to engage with the fixture 4 and which can execute a vertical lifting movement by which the two part consoles 3a, 3b can be clamped down tightly against the upper edge of the vehicle body. By this means, a simple possibility of fixture is provided which does not require additional hooks or straps.

The design form of the wind protection is shown in FIG. 1. In particular, the reference signs which have already been employed above describe corresponding objects. In this design, the lower transverse strut 1b of the frame lies roughly on the upper edge of the back reset of the rear seat row or is arranged in parallel to the same respectively. Frame 1 inclines forward, i.e. towards the direction of travel at an angle α, which is defined as the angle between the upper edge of the vehicle body and the frame 1 (lateral struts 1b, 1d). The angle α may here amount to between 0° and 90°, but by preference lies between 30° and 70°. In the present example of execution, it amounts by preference to 45°. Between the respective lateral struts 1c, 1d of the frame 1 and the respective part consoles 3a, 3b, a connecting device 5 is fitted which firmly joins frame 1 to the console 3. The connecting device 5 is in the present design example constructed as a triangular plate which supports frame 1 against the console 3 at the angle α. The connecting device 5 can also be constructed as a tube construction, which may be covered by a net, as was described above already, or by some other material retarding the air flow. The connecting device 5 may also be constructed of a rigid transparent material.

Another design form is shown in FIG. 1, where the angle α amounts by preference to 45° and is arranged in such a way that it can protect the passengers seated on the rear seats from an air flow acting in the passenger space area of the cabriolet from the top and from behind. The present design form is provided for passengers of small body size, such as e.g. children, whose heads are roughly level with the upper edge of the vehicle body or with the upper edge of the back rest of the rear seat row respectively. The children may in this case also be sitting on child seats where the seat position is about 10 to 20 cm. higher and about 15 cm. closer to the front seat row. By the appropriate inclination of the wind protection it is thus also possible to transport on the rear seats children sitting on child seats.

The design form shown in FIG. 1 may be provided with a hinge (not shown) between the lower transverse strut 1b of the frame and the console 3, so that the angle α is adjustable. In this way it is possible to set the wind protection to different head heights. Different angle positions can similarly be effected through the connecting device 5, but in that case the connecting device 5 is constructed so as to be adjustable. In this case, the connecting device 5 may be constructed as a rod, as is described in greater detail in the following in the design according to FIG. 2.

Figure 4:
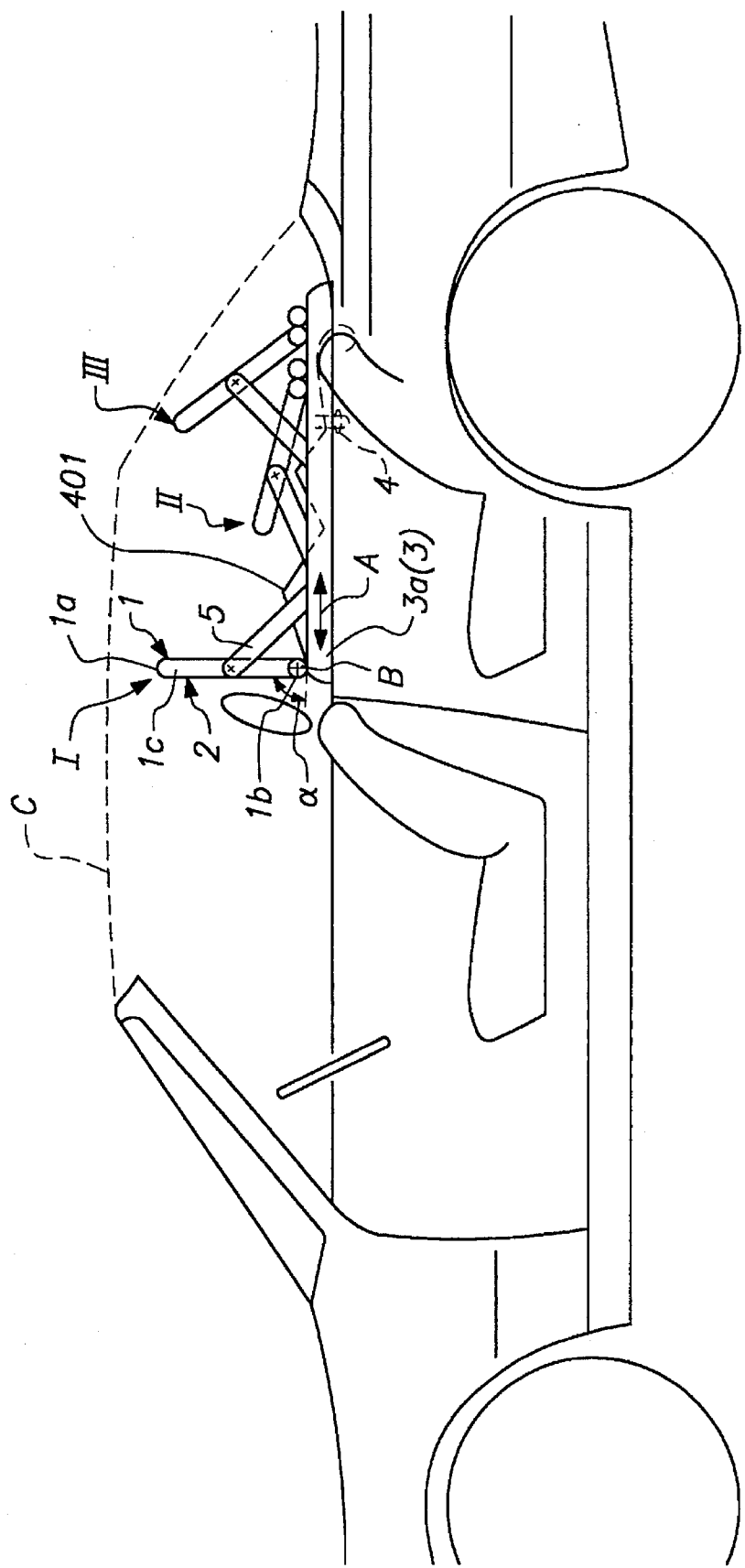
FIG. 4 shows an alternate embodiment of the wind protection structure illustrated in FIG. 2.

The design form of the wind protection represented in FIGS. 2 and 3 is described in greater detail below. The reference symbols already employed above describe the corresponding objects. In this design, the lateral part console 3a and 3b respectively is provided in each case with a guide A (schematically represented by the arrow), which permits it a linear mobility longitudinally in the direction of travel. The frame 1 is joined by its lower transverse strut 1b as an axis of rotation B to the guide so that it can rotate and so that it can be rotated about the angle α (shown schematically). By this arrangement, it is possible to displace the wind protection longitudinally along the driving direction and in doing so to adjust the angle α (which is defined in this design as identical to the above explanation). At the lower transverse strut, a rouleau 6 is fixed, which has a roller 7 pretensioned in the direction of rotation, and on which an elastic material 8 (hatched lines), retarding the air flow, is wound. For example, as elastic material, the net described above or some similar material reducing the air flow may be used, which need not, necessarily, be transparent. The roller 7 and the material 8 rolled up on it have a width which roughly corresponds to the width of the internal area of the passenger space. The loose end of the elastic material 8 is fixed to or behind the upper edge of the back rest of the rear seat or behind the same. The sprung pretension of the roller in this case holds the elastic material 8 under tension, even under the influence of an air current. The length of the elastic material that can be rolled off roughly corresponds to the longitudinal extent of the opening of the passenger space, so that this may be covered or locked respectively at the height of the upper edge of the vehicle body, if the wind protection is moved along the guidances A. Rouleau 6 may also be arranged so that the roller is fitted to or behind the upper edge of the back rest of the rear seat and the elastic material 8 to the lower transverse strut 1b. In an alternate embodiment illustrated in FIG. 4, the rouleau is constructed as a folded bellows 401 in zig-zag form.

Guide A can carry out a sliding movement by which the wind protection can be slid from a position directly behind the front row of seats up to a position behind the rear row of seats. The wind protection is adjustable between α=0° and α=180° by the rotating axis B. The angular position is locked by means by the connecting device 5. In this design form, the connecting device 5 is designed as a rod which is mounted with its one end in a middle section of the lateral strut 1c, 1d in rotating manner, and can be joined by its other end to various positions of the respective part console 3a, 3b, so that on the one hand the angle position α of frame 1 is adjustable, and simultaneously the frame 1 is supported in this position.

Positions I to III of frame 1 of the wind protection structure are described below:

Position I

The frame is in a vertical position, i.e. with angle α=90°, directly behind the front row of seats. The guide A is here in its forward stop position. The connective device 5 constructed as a rod here supports the frame 1 from its rear. The rouleau 6 is fully rolled out, so that the rear passenger space is fully covered. The height extension of the frame 1 is designed such that the frame 1 on the one hand projects above the heads of the passengers sitting on the front seats, but on the other hand, the frame 1 is within the external contour of a closed top, shown as hatched line C. In this position, air currents are reduced which act on the passenger space opening and could continue through the interstices of the front seats into the forward area of the vehicle, and also air currents which would act directly on the backs of the heads of the front passengers.

Position II

Frame 1 is arranged around a preferred angle of α=45° forward in the direction of travel. The lower transverse strut 1b of the frame 1 is in this case located directly above the upper edge of the back rest of the rear row of seats. The guide A is here close to its rear stop position. The connecting device 5 constructed as a rod supports the frame from its front. The rouleau is fully rolled up, so that the opening of the rear passenger space is open.

Position II is suitable for protecting passengers seated on the rear seat from an air flow acting from above and from behind in the rear passenger space area of the cabriolet. In this case, position II is intended for passengers of small body size, such as e.g. children, as described above, whose heads are roughly level with the upper edge of the vehicle body or with the upper edge of the back rest of the rear seat row respectively.

Position III

Frame 1 is arranged around the preferred angle of α=60° to the front against the direction of travel. The lower transverse strut 1b of the frame 1 is here located behind the upper edge of the back rest of the rear row of seats, but in front of the rear fixing edge of the cover. The guide A is here located in its rear stop position. The connecting device 5, here constructed as a rod, supports the frame from the front. The rouleau 6 may be slightly rolled out in reverse direction, with the opening of the rear passenger space being open.

Position III is suited to protecting the passengers seated on the rear seats from an air flow acting from the rear in the rear passenger space of the cabriolet. In this case, the position III is intended for adults sitting on the rear seats, whose heads project above the upper edge of the vehicle body or the upper edge of the back rest of the rear row of seats respectively.

At higher traveling speeds, the proportion of the air flow that affects the rear passenger space area from the top impacts only at a point of the vehicle further to the rear. In accordance with the arrangement in positions II and III, the wind protection makes an increased contribution against the air eddies resulting herefrom, which affect the passengers sitting on the rear row of seats and the passengers sitting in front.

In FIG. 3, the wind protection is shown in a slightly amended design. The wind protection in FIG. 3 takes up the position II described in accordance with FIG. 2. The part consoles 3a, 3b are designed in their longitudinal extension in such a manner that a rear canopy box 9 fitted behind the rear seat back rest may be opened and closed without colliding with the part consoles 3a, 3b. In order that the wind protection may take up the positions II and III (see also FIG. 2), the guide A is designed to be telescopic, so that it may move the wind protection backwards over the canopy box lid into positions II and III. In order to close or to open the canopy accordingly, it is necessary to slide the wind protection forward in the direction of the front seats, so that the wind protection is no longer located above the canopy box lid 9. This is the case, for example, in position I. However, after the completion of the closing procedure of the canopy, i.e. with the canopy closed, the positions II and III may be taken up again.

The dimensions of the wind protection arrangement are chosen so in the positions I to II, that the canopy may be in its closed position (C). It is therefore not necessary to dismantle the wind protection during summer operation of the cabriolet (hard top not fitted), if the canopy is closed or if passengers are seated on the back seats. The design in accordance with FIGS. 2 and 3 has the advantage, moreover, that it is very flexible, both for passengers on the front seats (position I), for children seated on the rear seats (position II) and also for adult passengers seated on the rear seats (position III).

The guide A according to the developments according to FIGS. 2 and 3 may be operated by a comfort drive with remote control from the driver (not shown), which is integrated in the console 3. In this case, the angle positions a may be set in the respective positions I to II by a movement coupled to the guide A. For the control or energy supply respectively of the comfort drive, the electric lead together with the appropriate operating switch (not shown) may be employed which is usually employed in cabriolets for defrosting devices or drying installations for precipitation located on the rear screen. The control may in this be arranged in such a manner that the operating switch for the defrosting installation sets the setting of the respective subsequent position of the positions I to III in operation. If the wind protection is e.g. in position I, position II will be moved to on operation of the switch. In case of a further activation, position III will be set, and then again position II, and so on. The coordination of the subsequent positions may be undertaken by a control unit usually already installed in any vehicle for the control of electrical windows and the coordination of the opening and closing of the hood of the cabriolet.

What is claimed is:

1. A wind protection structure for a cabriolet having front and rear rows of seats, said wind protection structure comprising:

a frame selectably positionable at locations adjacent said front row of seats to behind said rear row of seats and at desired inclination angles, the frame having a lower transverse portion extending over at least most of the width of the cabriolet; and a console connecting the lower transverse portion to said cabriolet, said console including a guide by which the frame can be variably positioned along the cabriolet.

2. The wind protection structure according to claim 1, wherein the frame comprises a pane composed of transparent material.

3. The wind protection structure according to claim 1, wherein the frame comprises a transparent net for retarding air flow, and wherein the lower portion includes a lower transverse strut.

4. The wind protection structure according to claim 1, wherein the console includes two part consoles arranged on two opposed longitudinal sides of the cabriolet.

5. The wind protection structure according to claim 1, including a connecting device between the console and the frame.

6. The wind protection structure according to claim 1, including airflow-retardant material attached to the frame and to an upper surface of the cabriolet such that in a first position of the frame, the airflow-retardant material is positioned substantially over the rear row of seats.

7. The wind protection structure according to claim 6, further including a roller on which, in a second position of the frame, the airflow-retardant material is substantially rolled up, and wherein in the first position of the frame, the airflow-retardant material is substantially unrolled from the roller.

8. The wind protection structure according to claim 7, wherein the roller is fixed to a lower transverse portion of the frame.

9. The wind protection structure according to claim 6, wherein the airflow-retardant material is constructed as a folded bellows in zig-zag form.

10. The wind protection structure according to claim 6, wherein the frame in the first position is substantially vertically disposed directly behind the front row of seats.

* * * * *